(12) United States Patent
Kauppinen et al.

(10) Patent No.: US 10,664,850 B2
(45) Date of Patent: May 26, 2020

(54) PROVIDING ADVERTISING CONTENT TO AT LEAST ONE COMMUNICATING TERMINAL

(75) Inventors: Risto A. Kauppinen, Helsinki (FI); Alex Esser, Helsinki (FI)

(73) Assignee: Provenance Asset Group LLC, Pittsford, NY (US)

( * ) Notice: Subject to any disclaimer, the term of this patent is extended or adjusted under 35 U.S.C. 154(b) by 727 days.

(21) Appl. No.: 11/617,926

(22) Filed: Dec. 29, 2006

(65) Prior Publication Data

US 2008/0162731 A1    Jul. 3, 2008

(51) Int. Cl.
*G06Q 30/02* (2012.01)

(52) U.S. Cl.
CPC .................... *G06Q 30/02* (2013.01)

(58) Field of Classification Search
CPC .... G06Q 30/02; H04M 3/4878; H04M 15/00; H04M 15/90
USPC ....................................................... 705/1–28
See application file for complete search history.

(56) References Cited

U.S. PATENT DOCUMENTS

| | | | |
|---|---|---|---|
| 6,947,531 B1 | 9/2005 | Lewis et al. | |
| 6,996,072 B1 | 2/2006 | Minborg | |
| 2002/0165773 A1* | 11/2002 | Natsuno | G06Q 30/02 705/14.58 |
| 2003/0163588 A1* | 8/2003 | Boberg | H04W 4/12 709/249 |
| 2003/0191689 A1 | 10/2003 | Bosarge et al. | |
| 2006/0166740 A1 | 7/2006 | Sufuentes | |
| 2007/0249406 A1* | 10/2007 | Andreasson | H04M 1/656 455/563 |

(Continued)

FOREIGN PATENT DOCUMENTS

| | | |
|---|---|---|
| EP | 1 220 552 A1 | 7/2002 |
| KR | 1020020037411 A | 5/2002 |

(Continued)

OTHER PUBLICATIONS

Print Screen page from CNNMoney.Com; Entitled "Google CEO: Free cellphones for all, if . . . "; Nov. 13, 2006; 2 sheets.

(Continued)

*Primary Examiner* — William A Brandenburg
(74) *Attorney, Agent, or Firm* — Dinsmore & Shohl LLP (57) ABSTRACT

An apparatus for providing advertising content to terminals communicating over a communications network is provided. The apparatus includes a processing element that communicates with network elements residing on the network or other networks to receive information regarding the terminals and their users. At least one of the terminals may be a mobile terminal. The processing element communicates an instruction to an advertising platform based on this information, and the advertising platform in turn selects and transmits advertising content to the respective terminals according to the instruction. Such content may include text messages, voice messages, picture messages, video clips, and more. In some cases, the processing element may determine a common characteristic of two or more terminals and their users based on the information received, and advertising content based on that common characteristic may be sent to the terminals. A method, system, and computer program product are also provided.

20 Claims, 2 Drawing Sheets

(56) References Cited

U.S. PATENT DOCUMENTS

2012/0063576 A1* 3/2012 Gilbert .............. G06Q 30/0269
379/93.01

FOREIGN PATENT DOCUMENTS

| KR | 1020050056979 A | 6/2005 |
|---|---|---|
| WO | WO 97/41654 | 11/1997 |
| WO | WO 01/89243 A1 | 11/2001 |

OTHER PUBLICATIONS

International Search Report for PCT/IB2007/054380 completed on Mar. 13, 2008.
Chinese Office action for corresponding CN application No. 200780051009.3 dated Feb. 25, 2011, pp. 1-8.
Korean Office action for corresponding KR application No. 10-2009-7015838 dated Apr. 15, 2011, pp. 1-7.
Chinese Office Action for related Chinese Patent Application No. 200780051009.3 dated Jan. 5, 2012, pp. 1-9.
Office Action for corresponding European Patent Application No. 07826897.6-1955, dated Feb. 16, 2016, 6 Pages.

* cited by examiner

PROVIDING ADVERTISING CONTENT TO AT LEAST ONE COMMUNICATING TERMINAL

TECHNOLOGICAL FIELD

Embodiments of the present invention relate generally to communications technology and, more particularly, to the provision of personalized advertising content to one or more terminals communicating over a communications network.

BACKGROUND

In a world where consumer goods and services abound, many people rely on advertisements to inform them of new products on the market. Advertisements today are as diverse, plentiful, and entertaining as the products they attempt to sell. Billboards, television commercials, radio spots, celebrity endorsements, newspaper ads—all are designed to capture people's attention in the hopes that the person's interest will be matched by the products being marketed and that the person will buy the product as a result.

However, the abundance of advertisements has caused some people to grow weary of commercials directed to a general audience. People no longer have the patience to endure advertising that markets products in which they have no interest. Televisions are muted or fast-forwarded through commercials, pages containing magazine and newspaper ads are quickly turned, and radio stations playing ads are switched to the next station. As a result, some advertisements of products and services never reach the people that would be most interested in them.

Tagging is a concept that has been used to facilitate the classification of information. A tag is a keyword or term that is associated with or assigned to a piece of information (like a picture, an article, or a video clip) and that describes the item. For example, tags are used on the Internet to describe webpages so that a person trying to find a webpage on a particular topic may be able to search the Internet for webpages relating to that topic. For instance, a webpage with content about how to purchase tickets to attend a Yankees' baseball game may have tags including "baseball," "tickets," and "Yankees."

Tags are generally created by the user or author of an item of information. For example, the author of a webpage would typically create the tags to describe that webpage. Tags may also be created as a result of a user filling out a questionnaire or creating a profile. A profile may include, for example, words to describe the person's lifestyle, her hobbies, her interests, and other characteristics. For example, as part of subscribing to a service, such as registering to obtain access to a certain website, a person may be required to create a profile. That person's profile may include the fact that he has three dogs, loves mountain biking, and enjoys traveling abroad.

Thus, there is a need for providing people with advertising content in a way that is personalized, tailored to match the person's interest, and is conveniently and unobtrusively provided to the person.

BRIEF SUMMARY

A system, method, computer program product and apparatus are therefore provided for providing advertising content to one or more terminals communicating over a communications network. Thus, the users of terminals may receive advertising content that is tailored to match the users' interests and situation.

In one exemplary embodiment, an apparatus for providing advertising content over a communications network is provided. The apparatus includes a processing element configured to receive information associated with more than one terminal communicating over a communications network, at least one of the terminals comprising a mobile terminal, and to communicate an instruction at least partially based on the information associated with the terminals to an advertising platform. The instruction communicated to the advertising platform directs the selection and transmission of advertising content by the advertising platform to at least one of the terminals.

In one embodiment, the processing element may be configured to receive information associated with at least two terminals that are communicating with each other. The processing element may be configured to determine a common characteristic of a user associated with each respective terminal at least partially based on the information received and to include the common characteristic in the instruction communicated to the advertising platform.

In some embodiments, the processing element may be configured to communicate with and receive information from other sources. The processing element may be configured to communicate with a database storing a plurality of profiles and to receive at least some of the information from the database at least partially based on at least one of the profiles. The processing element may also be configured to communicate with other external sources connected to the communications network, including Application Servers, Internet Protocol Multimedia Subsystems, Multimedia Messaging Service Centers, Short Messaging Service Centers, Mobile Switching Centers, and Intelligent Network Servers.

The processing element may also be configured to receive the information based at least partially on the content of a communication transmitted by at least one of the terminals. Furthermore, the processing element may be configured to receive the information and to communicate the corresponding instruction to the advertising platform in real time.

In another exemplary embodiment, a method for providing advertising content is provided. The method includes receiving information associated with more than one terminal communicating over a communications network, determining an instruction at least partially based on the information associated with the terminals that directs the selection and transmission of advertising content by an advertising platform to at least one of the terminals, and providing the instruction to the advertising platform. At least one of the terminals may include a mobile terminal. In some embodiments, determining the instruction may include comparing the information associated with at least two terminals communicating with each other and determining a common characteristic of a user associated with each respective terminal.

In addition, at least some of the information may be received from a database that stores profile information. The profile information may include identifying information, such as a user's name, address, age, occupation, or ethnic background; information regarding a user's interest, such as a user's hobby, sport, political affiliation, musical preference, literary preference, or religious preference; or personal information, such as a user's familial status, contact name, contact phone number, or contact relationship.

Some of the information may also or instead be received from at least one external source connected to the communications network, including an Application Server, an Internet Protocol Multimedia Subsystem, a Multimedia Messaging Service Center, a Short Messaging Service Center, a Mobile Switching Center, and an Intelligent Network Server. In some embodiments, the information may be based at least partially on the content of a communication transmitted by at least one of the terminals. Furthermore, the instruction provided to the advertising platform may be communicated in real time.

In another exemplary embodiment, a computer program product for providing advertising content is provided. The computer program product includes at least one computer-readable storage medium having computer-readable program code portions stored therein. The computer-readable program code portions include first, second, and third executable portions.

The first executable portion is for receiving information associated with more than one terminal communicating over a communications network, at least one of the terminals comprising a mobile terminal. The first executable portion may be configured for receiving at least some of the information from a database that stores profile information. In some embodiments, the first executable portion may be configured for receiving at least some of the information from at least one external source connected to the communications network. The external sources may include Application Servers, Internet Protocol Multimedia Subsystems, Multimedia Messaging Service Centers, Short Messaging Service Centers, Mobile Switching Centers, and Intelligent Network Servers. The first executable portion may further be configured for receiving at least some information based at least partially on the content of a communication transmitted by at least one of the terminals.

The second executable portion is for determining an instruction at least partially based on the information associated with the terminals that directs the selection and transmission of advertising content by an advertising platform to at least one of the terminals. In some embodiments, the second executable portion may be further configured for comparing the information associated with at least two terminals communicating with each other and determining a common characteristic of a user associated with each respective terminal.

The third executable portion is for providing the instruction to the advertising platform. The third executable portion may be configured for communicating the instruction to the advertising platform in real time.

In another exemplary embodiment, an apparatus for providing advertising content is provided. The apparatus includes means for receiving information associated with more than one terminal communicating over a communications network, at least one of the terminals comprising a mobile terminal. The apparatus also includes means for determining an instruction at least partially based on the information received that directs the selection and transmission of advertising content by an advertising platform to at least one of the terminals, as well as means for providing the instruction to the advertising platform.

In another exemplary embodiment, a system for providing advertising content is provided. The system includes a server and an advertising platform. The server is configured to receive information associated with more than one terminal communicating over a communications network, at least one of the terminals comprising a mobile terminal. The advertising platform is configured to receive an instruction from the server and to transmit advertising content to at least one of the terminals. The server is configured to provide the instruction based on the information associated with the terminals, and the advertising platform is configured to transmit the advertising content to each respective terminal based on the instruction including, at least partially, the information received.

In some embodiments, the server may be configured to receive information associated with at least two terminals communicating with each other. The server may further be configured to determine a common characteristic of a user associated with each respective terminal at least partially based on the information received and to include the common characteristic in the instruction communicated to the advertising platform.

The system may also include a database configured to store a plurality of profiles, wherein the server is configured to communicate with the database and to receive at least some of the information from the database based on at least one of the profiles. In some embodiments, the system may include an external source in communication with the server, such as an Application Server, an Internet Protocol Multimedia Subsystem, a Multimedia Messaging Service Center, a Short Messaging Service Center, a Mobile Switching Center, and an Intelligent Network Server, wherein the server is configured to receive at least some information from at least one of the external sources with which the server communicated.

In some embodiments, the server may be configured to receive the information based at least partially on the content of a communication transmitted by the at least one terminal. In addition, the advertising platform may be configured to transmit the advertising content to at least one of the terminals such that the advertising content is provided to a user of the respective terminal during a communication of the respective terminal. In some embodiments, the advertising platform may be configured to transmit the advertising content to at least one of the terminals such that the advertising content is provided to a user of the respective terminal after a communication of the respective terminal. Furthermore, the advertising platform may be configured to transmit the advertising content to at least one of the terminals such that the advertising content is provided to the user of the respective terminal upon a subsequent interaction of the user with the terminal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

Figure 1:
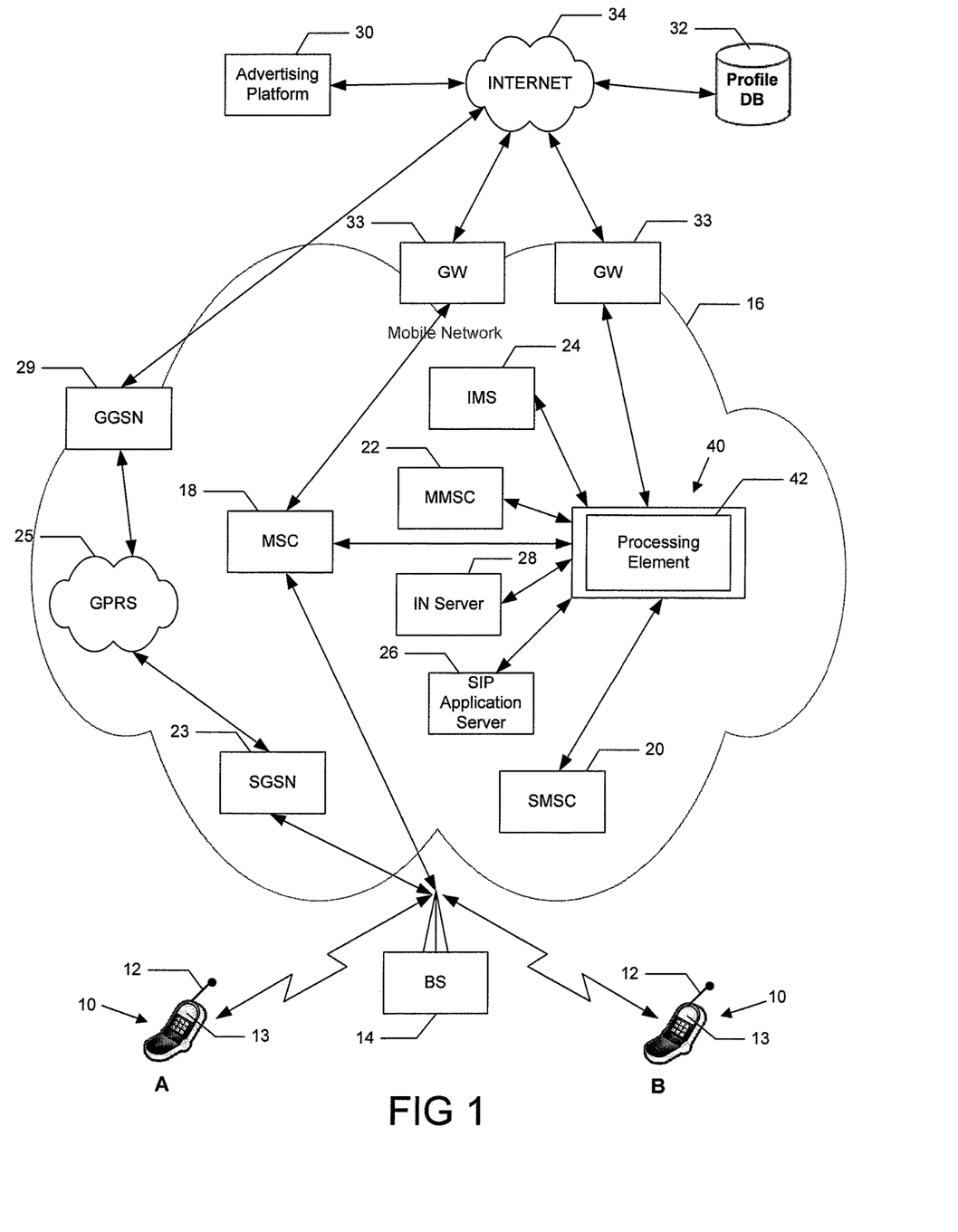
FIG. 1 is a schematic block diagram of a wireless communications system according to an exemplary embodiment of the present invention.

FIG. 1 is a schematic block diagram of a wireless communications system according to an exemplary embodiment of the present invention. Although FIG. 1 is an illustration of one type of system that would benefit from embodiments of the present invention, other embodiments may be deployed in conjunction with other types of systems. As shown in the illustrated embodiment, however, the system includes one or more terminals, such as mobile terminals 10, which may include a mobile telephone, a portable digital assistant (PDA), a mobile computer, a mobile television, a gaming device, a laptop computer, a camera, a video recorder, a GPS device, or other type of voice and text communication system. Each mobile terminal 10 may comprise an antenna 12 (or multiple antennae) for transmitting signals to and for receiving signals from a base site or base station (BS) 14. The base station 14 may be part of one or more cellular or mobile networks, each of which comprises elements, typically including additional BSs required to operate the network.

The network may be, for example, a mobile network 16 and may include a mobile switching center (MSC) 18 configured to route calls to and from the mobile terminal 10 when the mobile terminal 10 is making and receiving calls. The MSC 18 may also provide a connection to other terminals, such as landline trunks when the mobile terminal 10 is involved in a call. In addition, the MSC 18 may be capable of controlling the forwarding of messages to and from the mobile terminal 10. The MSC 18 may also control the forwarding of messages for the mobile terminal 10 to and from a messaging center, such as a short messaging service center (SMSC) 20 or a multimedia messaging service center (MMSC) 22. It should be noted that although the MSC 18 is shown in the system of FIG. 1, the MSC 18 is merely an exemplary network device and embodiments of the present invention are not limited to use in a network employing an MSC. Although not shown in FIG. 1, the MSC 18 may communicate with certain network elements, such as the SMSC 20 and the MMSC 22.

The short messaging service center (SMSC) 20 is generally configured to facilitate the transmission of short text messages to and from mobile terminals 10 that are capable of sending such text messages. The SMSC 20 may, for example receive a short text message from one cellular telephone and transmit it to another cellular telephone designated as the intended recipient. Similarly, the multimedia messaging service center (MMSC) 22 may be configured to send and receive multimedia objects, such as images, audio, video, and rich text between mobile terminals 10.

The BS 14 can also be coupled to a Serving GPRS (General Packet Radio Service) Support Node (SGSN) 23. As known to those skilled in the art, the SGSN 23 is typically capable of performing functions similar to the MSC 18 for packet switched services. The SGSN 23, like the MSC 18, can be coupled to a data network, such as the Internet 34. The SGSN 23 can be directly coupled to the data network. In a more typical embodiment, however, the SGSN 23 is coupled to a packet-switched core network, such as a GPRS core network 25. The packet-switched core network is then coupled to another gateway device, such as a Gateway GPRS Support Node (GGSN) 29, and the GGSN 29 is coupled to the Internet 34. In addition to the GGSN 29, the packet-switched core network can also be coupled to a GW 33. Also, the GGSN 29 can be coupled to a messaging center. In this regard, the GGSN 29 and the SGSN 23, like the MSC 18, may be capable of controlling the forwarding of messages, such as multimedia messages. The GGSN 29 and SGSN 23 may also be capable of controlling the forwarding of messages for the mobile terminal 10 to and from the messaging center.

In addition, by coupling the SGSN 23 to the GPRS core network 25 and the GGSN 29, devices such as a computing system and/or origin server (not shown) may be coupled to the mobile terminal 10 via the Internet 34, SGSN 23 and GGSN 29. In this regard, devices such as the computing system and/or origin server may communicate with the mobile terminal 10 across the SGSN 23, GPRS core network 25 and the GGSN 29. By directly or indirectly connecting mobile terminals 10 and the other devices (e.g., computing system, origin server, etc.) to the Internet 34, the mobile terminals 10 may communicate with the other devices and with one another, such as according to the Hypertext Transfer Protocol (HTTP) and/or the like, to thereby carry out various functions of the mobile terminals 10.

The exemplary system illustrated in FIG. 1 also includes an Internet Protocol multimedia subsystem (IMS) 24, a Session Initiation Protocol (SIP) application server 26, and an Intelligent Network (IN) server 28. The IMS 24 may be configured to provide mobile terminals 10 with access to IP services, such as services provided by the Internet. This may include Voice over Internet Protocol (VoIP), Push-to-talk over Cellular (POC), multiparty gaming, videoconferencing, messaging, and content sharing, among others. The SIP application server 26 may support communications such as VoIP communications and other text and multimedia sessions, like instant messaging, video, online games, voice mail, fax mail, text to speech, find me/follow me, and speech recognition applications, as well as other services. The IN server 28 provides mobile terminals 10 communicating over the mobile network 16 with additional services, such as toll-free calling, pre-paid calling, and call screening.

Although not every element of every possible mobile network is shown and described herein, it should be appreciated that the mobile terminal 10 may be coupled to one or more of any of a number of different networks through the BS 14 or other gateway or access device. In this regard, the network(s) may be capable of supporting communication in accordance with any protocol, such as one or more of a number of first-generation (1G), second-generation (2G), 2.5G, 2.75G, third-generation (3G), 3.9G, fourth-generation (4G) mobile communication protocols and/or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. As a further example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The exemplary system of FIG. 1 also includes an advertising platform 30 and a profile database 32. Either the advertising platform 30 or the profile database 32 or both may reside within the mobile network 16. In the illustrated embodiment, however, these systems reside within other networks that are in communication with the mobile network 16, such as a private network or a wide area public network, such as the Internet 34, via a gateway (GW) 33 or the like.

The advertising platform 30 may be a database, a server, or any other device or system on which advertising content may be stored and accessed. For example, the advertising platform 30 may be a server configured to store various forms of advertising content relating to different products and services, to select particular advertising content from amongst the stored advertising content, and to control delivery of the selected advertising content to one or more terminals, at least one of which may be a mobile terminal 10. Such advertising content may include text message advertisements, audio advertisements in the form of incoming calls or voice messages, audio advertisements in the form of tunes, video clip advertisements, picture advertisements, or links to product or service webpages.

The profile database 32 may provide for the storage of and access to user profiles. User profiles may include tags relating to the hobbies, interests, preferences, and other characteristics of users of the terminals. For example, a user profile may contain identifying information pertaining to the user, such as the user's name, address, age, occupation, and ethnic background. The profile may also contain information regarding the personal interests of the user, such as hobbies, sports, political affiliations, musical preferences, literary preferences, religious preferences, and other events, products, or past times identified by the user. In addition, the profile may contain personal information on the user, such as the user's familial status, the names and phone numbers of contacts, and the nature of the contact relationship, such as whether the contact is a friend, family member, or co-worker. A contact may be, for example, an individual or other entity with whom the user communicates.

A user profile may be created by a user upon subscribing to a wireless telephone network. The new subscriber of this example may fill out an on-line questionnaire that asks about his occupation, his familial status, his hobbies and interests, and any products in particular in which he may be interested. The new subscriber may complete the questionnaire because he is interested in receiving information about products and services that match his interests, and he may further be persuaded to complete the form as the result of a monetary incentive offered by the network provider, such as a discount on service or other products, a rebate, a coupon, or other reward. Once profile information is created by a user, tags may be generated based on the profile information provided. The profiles, the tags, or both may be stored by the profile database 32.

Continuing to refer to FIG. 1, an apparatus 40 is provided in accordance with one embodiment for directing the delivery of advertising content to the terminal(s). The apparatus 40 comprises a processing element 42 configured to communicate with various network elements including, but not limited to, the elements described above in the mobile network 16 and in other networks in communication with the mobile network 16. The processing element may be comprised of various means for performing the functions described below with each of the means embodied, in one embodiment, by any suitable computing device, such as a processor, an application-specific integrated circuit (ASIC), a computer, or the like operating under control of software stored, for example, in a memory device associated or otherwise in communication with the processing element.

The apparatus 40 may reside within the mobile network 16, as shown in FIG. 1, or the apparatus 40 may reside on a different network, such as a private network or the Internet. Regardless, the processing element 42 is configured to receive information associated with a number of terminals, at least one of which may be a mobile terminal 10, communicating over a communications network (such as the mobile network 16) and to communicate an instruction that is at least partially based on the information associated with the terminals to the advertising platform 30.

For example, the processing element 42 of the apparatus 40 may receive information from the MSC 18 that mobile terminal A is placing a call to mobile terminal B. Such information may include the mobile telephone number or the Integrated Services Digital Network (ISDN) number of the respective mobile terminals 10. Although the embodiment of FIG. 1 depicts the BS 14 to be directly connecting the mobile terminals 10, the mobile terminals 10 may be serviced by different MSCs and, indeed, may be in different networks with at least one of the terminals being a landline telephone in one embodiment. Furthermore, the information associated with the terminals may be received from one or more of the communicating terminals. Upon receiving the information, the processing element 42 may query the profile database 32 to receive any tags associated with the users of mobile terminals A or B. For example, the processing element 42 may receive from the profile database 32 information that user A is a "skier," is a "college student," and likes to "travel." The processing element 42 may also receive information from the profile database 32 that user B enjoys "gardening," is a "mother," and wishes to "travel" to "Italy."

Based, at least in part, on the information received, the processing element 42 is configured to communicate an instruction to the advertising platform 30. This instruction in turn informs the selection of appropriate advertising content by the advertising platform 30, which content is then transmitted to one or more of the terminals associated with the information that resulted in the instruction, for example to the mobile terminals 10 via the GGSN 29. For instance, continuing the scenario above, the processing element 42 may communicate an instruction to the advertising platform 30 to send mobile terminal A advertising content pertaining to Spring Break deals at ski resorts. The instruction may also instruct the advertising platform 30 to send mobile terminal B advertising content marketing home delivery of tulip bulbs.

The instruction may include the recipient of the advertising content, as well as the content of the advertisement to be sent (e.g., Spring Break deals versus tulip bulbs). The instruction may also specify the format of the content, such as text message for the college student A and voice message for the mother B. In one embodiment, the instruction may specify a general category of advertising content, such as "skiing," and the advertising platform 30 may select from among the different ski-related advertisements the particular advertising content to send.

The processing element 42 may be configured to receive information associated with at least two terminals that are or are seeking to be in communication with one another and to use this information to determine a common characteristic of the users of the terminals. For example, in the situation described above, the processing element 42 may determine that a common interest between user A and user B is "travel." The processing element 42 may then include "travel" as part of the instruction that is communicated to the advertising platform 30. As a result, the advertising platform 30 may select advertising content directed to travel websites or discount airfare to both users. The advertising platform 30 may, for example, transmit the same advertising information to both mobile terminals A and B, such as a picture advertisement marketing travel packages for visiting the Italian Alps.

The advertising content transmitted to the terminals, such as mobile terminals A and B in the previous examples, may be provided to the users A and B during their mutual telephone conversation. For example, each user may hear a tone indicating another incoming call which, if answered, would provide a short audio message advertising the Italian travel package. As another example, the terminals may display a photo of the advertisement during the conversation, including the special price and other information. Receipt of such advertising content during the communication between users A and B may encourage them to discuss plans to take a trip together, possibly to the Italian Alps. As a further example, the advertising content may be played during the call ringing or call waiting phase of the telephone conversation.

Alternatively, the advertising content may be transmitted to the terminals such that the content is displayed after the communication is terminated, for example after A sends B an instant message. In this case, the advertising content may be provided (e.g., played or displayed) as soon as one of the users sends an instant message to the other user. For example, upon pressing a "Send" button to send the instant message, the mobile terminal 10 may produce a ring tone to indicate an incoming call, which may be the audio message of the advertising content, or the user(s) may receive another instant message containing the advertising content. As a further example, a picture or video clip advertisement may automatically be displayed on a screen 13 of the mobile terminal 10 upon termination of the communication.

Rather than providing the advertising content immediately following termination of the communication, the advertising content may be provided upon the next interaction of the user with the terminal. For example, the next time user A attempts to place a call, a photo advertisement may be displayed on the screen 13 of the mobile terminal 10. Or, the next time user B checks her voice mail, there may be a voice message advertisement waiting in her inbox. The timing of the delivery of the advertising content also may be included in the instruction from the apparatus 40.

The processing element 42 may receive information, which may include tags and information identifying the terminals, from other sources, in addition to or instead of receiving information from the profile database 32. The processing element 42 of some embodiments may receive information from various network elements connected to or in communication with the communications network. For example, the processing element 42 may receive information from the SMSC 20, the MMSC 22, the IMS 24, the SIP application server 26, and the IN server 28, as well as other systems not shown in FIG. 1. As an example, the college student A may use his mobile terminal 10 to send a text message to his friend. Upon his sending the text message, the processing element 42 may receive from the SMSC 20 information including the mobile terminal 10 originating the text message and the mobile terminal (or terminals) 10 receiving the text message. Upon receiving this information, the processing element 42 may receive further information from the profile database regarding the interests of each user, as described above. Similarly, and as a further example, the processing element 42 may receive information from the MMSC 22 regarding a picture message, or from the IMS regarding a content sharing event, and so on, involving a mobile terminal 10. The processing element 42 would then communicate a corresponding instruction to the advertising platform 30, as previously described, to push the appropriate advertising content.

In another embodiment, the processing element 42 may be configured to receive information that is based at least partially on the content of a communication transmitted between two or more terminals. Going back to the example, the mother B may use her mobile terminal 10 to send to her son A a picture of his bedroom following the conversion of the bedroom to an exercise room. The picture may have certain tags associated with it, such as "home improvement" or "exercise." In this example, the transmission of the tagged picture from B to A may cause the processing element 42 of the apparatus 40 to receive information including the tags associated with the picture as well as identifying information on A and B. The processing element 42 may, for example, receive the tags "home improvement" and "exercise" directly from B's mobile terminal 10 or indirectly via the MMSC 22 or other network element. Based in part on the information received, the processing element 42 would communicate an instruction to the advertising platform 30, which may result in the selection and transmittal of appropriate advertising content, such as discounts at home improvement stores or a clip from a newly-released exercise video.

In some embodiments, the processing element 42 is configured to receive the information and communicate the corresponding instruction to the advertising platform 30 in real time. In this way, as previously mentioned, parties to a communication may receive advertising content that is personalized to each user's tastes or to their collective tastes during the communication that triggered the transmission of the advertising content. Furthermore, in some embodiments, advertising content that also considers the content of the communication that triggered the transmission may be received during or immediately following the communication, adding to the relevance of the advertising content.

Figure 2:
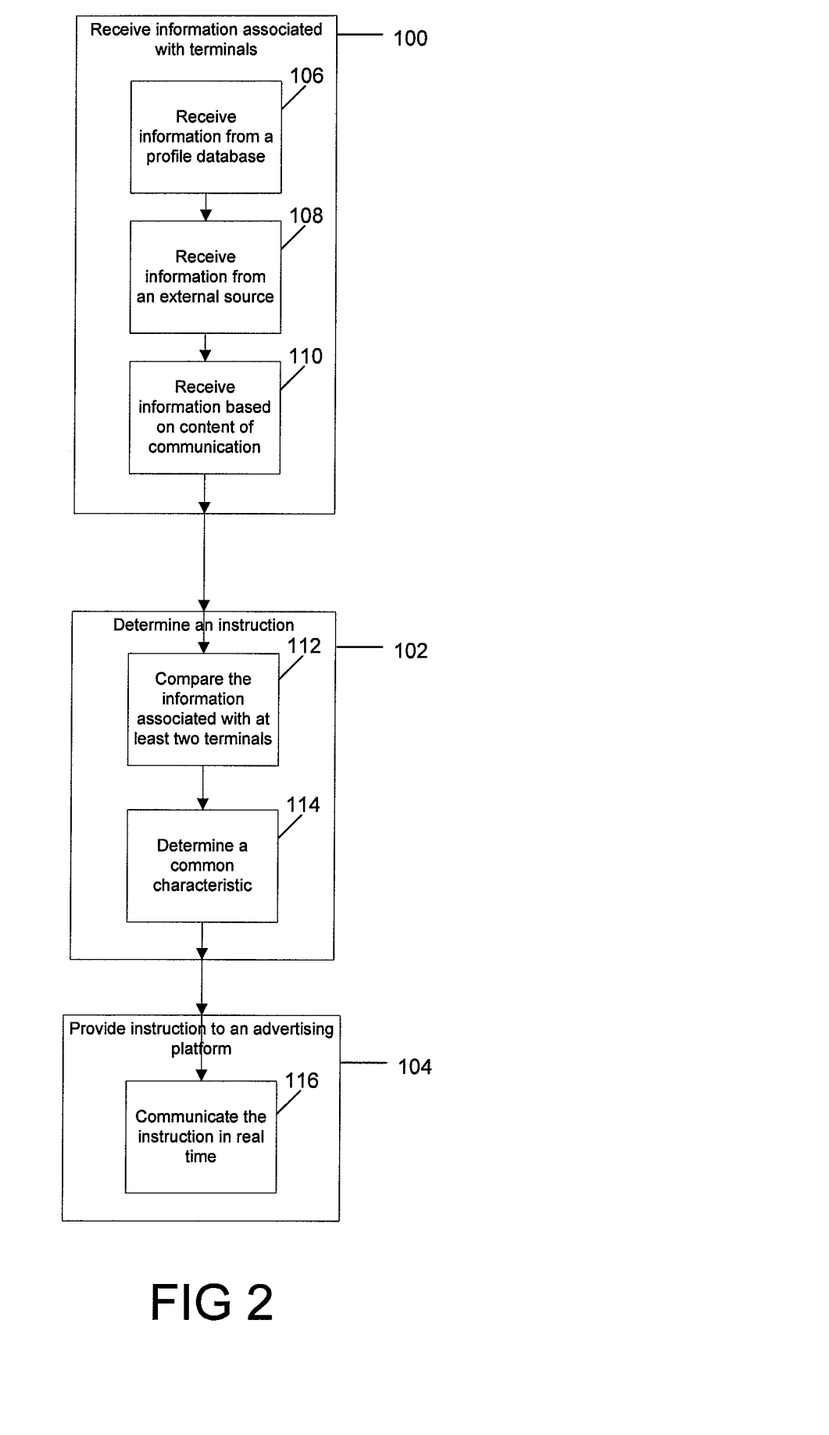
FIG. 2 illustrates a flowchart according to an exemplary method for providing advertising content to terminals according to an exemplary embodiment of the present invention.

In other embodiments, a method for providing advertising content over a communications network is provided. Referring to FIG. 2, information associated with terminals, including at least one mobile terminal, communicating over a communications network is received. An instruction for selecting advertising content to be transmitted to at least one of the terminals is then determined, based at least in part on the information associated with the terminals, and the instruction is provided to an advertising platform. See FIG. 2, blocks 100-104.

The information may be received from a variety of sources and in different ways. Some of the information may be received from a database in which profiles are stored. See block 106. As previously described, profiles may include tags and other information regarding the habits, hobbies, interests, and other characteristics of a user of a terminal. Information may also be received from one or more external sources residing on the network or in communication with the network. See block 108. Such sources may include a SIP application server, an IMS, an MMSC, a SMSC, a MSC, and an IN server, among others. Furthermore, information may be received that is based at least partially on the content of a communication transmitted by one or more terminals, as previously discussed. See block 110. For example, tags associated with communications such as text messages, picture messages, tunes, video clips, and interactive games, among other communications, may be received and included in the determination of an instruction to the advertising platform.

In some embodiments, information associated with one terminal may be compared against information associated with another terminal, where the two terminals (or more) are communicating with each other. See block 112. For example, if two terminals are communicating with each other, such as during a telephone conversation, the information associated with the two terminals may be compared. Based on the comparison, a common characteristic, such as a common interest, may be determined and thereby incorporated into the instruction provided to the advertising platform. See block 114. For example, the users of two mobile terminals engaged in a telephone conversation may both have "football" as a common interest. In that case, "football" may be included in the instruction to the advertising platform, and the users may receive a link on their mobile terminals directing them to the webpage of a sporting goods store.

The provision of an instruction to the advertising platform may occur in real time or near real time. See block 116. In other words, there may be very little delay between the time the terminal initiates a communication, triggering the initial receipt of information, to the ultimate transmission of advertising content from the advertising platform to the terminal. In this way, users of the terminals involved in an interaction may receive advertising content during that same triggering communication or immediately thereafter.

Although embodiments have been described above in which a plurality of mobile terminals communicate via a mobile network, other embodiments can employ other types of communications networks including, for example, wireless networks including wireless local area networks and adhoc networks created via Bluetooth or other wireless links. Additionally, while at least one of the terminals involved in the communication is typically a mobile terminal as described above, other embodiments contemplate that the one or more mobile terminals may be in communication with other types of terminals, such as one or more landline terminals. As such, at least a portion of the communications network may also include a public switched telephone network (PSTN) or other wireline network.

As described above and as will be appreciated by one skilled in the art, embodiments of the present invention may be configured as a system, method or network entity. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as the processing element 40, to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for automatically selecting and transmitting targeted advertisement content to mobile terminals, comprising:

at least one processor and at least one memory including computer program code, the at least one memory and the computer program code configured to, with the at least one processor, cause the apparatus to:

receive a first communication associated with a first mobile terminal communicating over a communications network;

receive a second communication associated with a second mobile terminal communicating over the communications network, wherein the first and second communications are received during a terminal communication between the first and second mobile terminals;

determine one or more tags based on a content of the first communication, wherein the one or more tags define a first information;

determine one or more tags based on a content of the second communication, wherein the one or more tags define a second information;

automatically compare in real time the first information associated with the first mobile terminal and the second information associated with the second mobile terminal to each other based, at least in part, on the content of the communications transmitted by one of the mobile terminals to the other of the mobile terminals upon the terminal communication between the first and second mobile terminals, wherein the communication is a multimedia communication such that the content of the communication includes multimedia images and the one or more tags associated with the multimedia communication are determined from multimedia images;

automatically determine a common characteristic comprising a match between the one or more tags of a user of the first mobile terminal and a user of the second mobile terminal based on the comparison of the information associated with the one or more tags of the content of the communications; and communicate in real time during the terminal communication an instruction that includes the common characteristic for communication to the advertising platform, wherein the instruction directs the selection and transmission of advertising content relating to the common characteristic to at least one of the mobile terminals.

2. The apparatus of claim 1 wherein the at least one memory and the computer program code configured to, with the at least one processor, cause the apparatus to communicate with at least one external source connected to the communications network selected from the group consisting of an Application Server, an Internet Protocol Multimedia Subsystem, a Multimedia Messaging Service Center, a Short Messaging Service Center, a Mobile Switching Center, and an Intelligent Network Server.

3. The apparatus of claim 1 wherein the at least one memory and the computer program code configured to, with the at least one processor, cause the apparatus to receive the first and second information and to communicate the corresponding instruction to the advertising platform in real time.

4. A method for automatically selecting and transmitting targeted advertisement content to mobile terminals comprising:

receiving a first communication associated with a first mobile terminal communicating over a communications network;

receiving a second communication associated with a second mobile terminal communicating over the communications network, wherein the first and second communications are received during a terminal communication between the first and second mobile terminals;

determining one or more tags based on a content of the first communication, wherein the one or more tags define a first information;

determining one or more tags based on a content of the second communication, wherein the one or more tags define a second information;

automatically comparing in real time the first information associated with a user of the first mobile terminal and the second information associated with a user of the second mobile terminal to each other based, at least in part, on the content of the communication transmitted by one of the mobile terminals to the other of the mobile terminals upon the terminal communication between the first and second mobile terminals, wherein the communication is a multimedia communication such that the content of the communication includes multimedia images and the one or more tags associated with the multimedia communication are determined from the multimedia images;

automatically determining a common characteristic comprising a match between the one or more tags of the user of the first mobile terminal and the user of the second mobile terminal based on the comparison of the first and second information associated with the one or more tags of the content of the communications; and communicating real time during the terminal communication an instruction that includes the common characteristic to an advertising platform, wherein the instruction directs the selection and transmission of advertising content to at least one of the terminals.

5. The method of claim 4 wherein a database resides outside of the communications network and stores profile information comprises identifying information selected from the group consisting of a name, address, age, occupation, and ethnic background of a user.

6. The method of claim 5 wherein the profile information comprises information regarding interests selected from the group consisting of a hobby, sport, political affiliation, musical preference, literary preference, and religious preference of a user.

7. The method of claim 5 wherein the profile information comprises personal information selected from the group consisting of a familial status, contact name, contact phone number, and contact relationship.

8. The method of claim 4 wherein receiving the first or second information comprises receiving at least some of the first or second information from at least one external source connected to the communications network selected from the group consisting of an Application Server, an Internet Protocol Multimedia Subsystem, a Multimedia Messaging Service Center, a Short Messaging Service Center, a Mobile Switching Center, and an Intelligent Network Server.

9. The method of claim 4 wherein receiving the first or second information comprises receiving the first or second information based at least partially on the content of a communication transmitted by at least one of the terminals to the other of the terminals, wherein the communication is a multimedia communication and the content includes one or more tags associated with the multimedia communication.

10. The method of claim 4 wherein providing the instruction to the advertising platform comprises communicating the instruction to the advertising platform in real time, and wherein the instruction directs the transmission of the advertising content by the advertising platform to the at least one of the terminals to occur during the terminal communication between the first and second terminals.

11. A computer program product for automatically selecting and transmitting targeted advertisement content to mobile terminals, the computer program comprising at least one computer-readable storage medium having computer-readable program code portions stored therein, the computer-readable program code portions comprising:

a first executable portion for receiving a first communication associated with a first mobile terminal communicating over a communications network;

a second executable portion for receiving a second communication associated with a second mobile terminal communicating over the communications network, wherein the first and second communications are received during a terminal communication between the first and second mobile terminals;

determine one or more tags based on a content of the first communication, wherein the one or more tags define a first information;

determine one or more tags based on a content of the second communication, wherein the one or more tags define a second information;

a third executable portion for comparing in real time the first information associated with the first mobile terminal and the second information associated with the second mobile terminal to each other based, at least in part, on a content of the first communication transmitted by the first mobile terminal to the second mobile terminal upon the terminal communication between the first and second mobile terminals, wherein the communication is a multimedia communication such that the content of the communication includes multimedia images and the one or more tags associated with the multimedia communication are determined from multimedia images, and determining a common characteristic comprising a match between the one or more tags of a user of the first mobile terminal and a user of the second mobile terminal based on the comparison of the information associated with the one or more tags of the content of the communications; and a fourth executable portion for communicating in real time during the terminal communication an instruction to an advertising platform, wherein the instruction directs the selection and transmission of advertising content to at least one of the mobile terminals based on the common characteristic between the user of the first mobile terminal and the user of the second mobile terminal.

12. A computer program product according to claim 11, wherein at least one of said first and said second executable portions is further configured for receiving at least some of the first or second information from at least one external source connected to the communications network selected from the group consisting of an Application Server, an Internet Protocol Multimedia Subsystem, a Multimedia Messaging Service Center, a Short Messaging Service Center, a Mobile Switching Center, and an Intelligent Network Server.

13. A computer program product according to claim 11, wherein at least one of said first and said second executable portions is further configured for receiving at least some of the first or second information based at least partially on the content of a communication transmitted by at least one of the terminals to the other of the terminals, wherein the communication is a multimedia communication and the content includes one or more tags associated with the multimedia communication.

14. A computer program product according to claim 11, wherein said fourth executable portion is further configured for communicating the instruction to the advertising platform in real time.

15. A system for automatically selecting and transmitting targeted advertisement content to mobile terminals, comprising:

a server computer configured to receive a first communication associated with a first mobile terminal and a second communication associated with a second mobile terminal, wherein the first and second communications are received during a terminal communication between the first and second mobile terminals over a communications network; and an advertising platform comprising a processor configured to receive an instruction from the server computer and to transmit advertising content to at least one of the terminals;

wherein the server computer provides communicates the instruction to the advertising platform in real time during the terminal communication, the instruction including a common characteristic of a user of the first mobile terminal and a user of the second mobile terminal based, at least in part, on a:

determination of one or more tags based on a content of the first communication and the second communication that define a first information and a second information;

comparison of the first information associated with the first mobile terminal from the one or more tags of the content and the second information associated with the second mobile terminal from the one or more tags of the content to each other upon the terminal communication between the first and second mobile terminals, the common characteristic comprising a match between the one or more tags of the first information and the second information, wherein the server computer transmits the advertising content to at least one of the terminals.

16. The system of claim 15 further comprising an external source m communication with the server computer selected from the group consisting of an Application Server, an Internet Protocol Multimedia Subsystem, a Multimedia Messaging Service Center, a Short Messaging Service Center, a Mobile Switching Center, and an Intelligent Network Server, wherein the server computer is configured to receive at least some first or second information from at least one of the external sources with which the server computer communicated.

17. The system of claim 15 wherein the server computer is configured to receive the first or second information based at least partially on the content of a communication transmitted by at least one of the terminals to the other of the terminals, wherein the communication is a multimedia communication and the content includes one or more tags associated with the multimedia communication.

18. The system of claim 15 wherein the advertising platform is configured to transmit the advertising content to at least one of the terminals such that the advertising content is provided to a user of the respective terminal during a communication of the respective terminal.

19. The system of claim 15 wherein the advertising platform is configured to transmit the advertising content to at least one of the terminals such that the advertising content is provided to a user of the respective terminal after a communication of the respective terminal.

20. The system of claim 19 wherein the advertising platform is configured to transmit the advertising content to the respective terminal such that the advertising content is provided to the user of the respective terminal upon a subsequent interaction of the user with the terminal.

* * * * *